(12) United States Patent  
Gindele et al.

(10) Patent No.: US 8,520,923 B2  
(45) Date of Patent: Aug. 27, 2013

(54) REPORTING ORGAN VOLUME FOR A MEDICAL DIGITAL IMAGE

(75) Inventors: Edward B. Gindele, Rochester, NY (US); Lawrence A. Ray, Rochester, NY (US)

(73) Assignee: Carestream Health, Inc., Rochester, NY (US)

( * ) Notice: Subject to any disclaimer, the term of this patent is extended or adjusted under 35 U.S.C. 154(b) by 214 days.

(21) Appl. No.: 13/204,646

(22) Filed: Aug. 6, 2011

(65) Prior Publication Data

US 2013/0034278 A1    Feb. 7, 2013

(51) Int. Cl.  
*G06K 9/00* (2006.01)

(52) U.S. Cl.  
USPC ........................................................ 382/128

(58) Field of Classification Search  
USPC ..... 382/128–134; 128/920–925; 356/39–49; 600/407–414, 424–426; 345/581–618  
See application file for complete search history.

(56) References Cited

U.S. PATENT DOCUMENTS

| | | |
|---|---|---|
| 6,681,054 B1 | 1/2004 | Gindele |
| 2003/0215155 A1 | 11/2003 | Serrano et al. |
| 2007/0116347 A1 | 5/2007 | Hong |
| 2008/0118136 A1 | 5/2008 | Cai et al. |

OTHER PUBLICATIONS

Freiman et al., *International Journal of Computer Assisted Radiology and Surgery*, vol. 3, No. 5, Nov. 2008.  
Rudin, Osher, and Fatemi, "Nonlinear total variation based noise removal algorithms" published in *Proceedings of the Eleventh Annual International Conference of the Center for Nonlinear Studies on Experimental Mathematics : Computational Issues in Nonlinear Science* (1992), pp. 259-268.  
R. Malladi, J.A. Sethian, "Level Set and Fast Marching Methods in Image Processing and Computer Vision" Proceedings of IEEE International Conference on Image Processing, Lausanne, Switzerland, Sep. 16-19, 1996, pp. 489-492.  
J.A. Sethian, *Level Set Methods and Fast Marching Methods*, Cambridge University Press, 1996.  
Press, Flannery, Teukolsky, and Vetterling, *Numerical Recipes in C*, Cambridge University Press, 2d ed., 1988, pp. 408-412.  
Co-pending U.S. Appl. No. 12/964,780, filed Dec. 10, 2010, entitled: Segmenting an Organ in a Medical Digital Image, by Edward B. Gindele.

*Primary Examiner* — Atiba O Fitzpatrick

(57) ABSTRACT

A method for providing a calculated volume data value for an organ of a patient acquires image data for a first volume image series and for at least a second volume image series for the patient and displays the first volume image series. The method responds to an instruction to generate the volume data value by identifying a seed point in the first volume image series, correlating the seed point to the second volume image series, segmenting the organ in at least the second volume image series according to the correlated seed point, and calculating the volume data value for the organ using at least the segmented second volume image series. The calculated volume data value can be displayed.

21 Claims, 12 Drawing Sheets

REPORTING ORGAN VOLUME FOR A MEDICAL DIGITAL IMAGE

FIELD OF THE INVENTION

The present invention relates to the field of digital imaging, and more particularly to segmenting an organ in a medical digital image and reporting the volume of the segmented organ.

BACKGROUND

Image segmentation is a branch of digital image processing for categorizing or classifying the picture elements of a digital image as belonging or associated with one or more class types. For medical imaging applications, image segmentation is commonly performed on the voxels (volume elements) of a 3-dimensional image data set with the classification types relating to various anatomical structures. In thoracic medical images, for example, it is convenient to segment the image voxels into classes such as bone, lung parenchyma, soft tissue, bronchial vessels, blood vessels, etc. There are many reasons to perform such a task, such as for surgical planning, treatment progress, and patient diagnosis.

Among image segmentation approaches is the technique generally known as region growing. Region growing begins by identifying a seed point, i.e., a voxel position that is known to be part of a particular class type. A region of voxels, often contiguous in nature, is then grown or otherwise developed about the seed point. The region growing process progresses until a terminating condition is satisfied, e.g., no more voxels that meet suitable criteria are found, or a predetermined number of voxels have been visited, etc. Conventional segmentation approaches that begin with a seed point have been found to work acceptably for some types of organ segmentation problems.

The liver, because of the relatively complex tissue structure of this organ, proves to be particularly challenging for conventional segmentation approaches. One conventional technique is described in a paper entitled "An iterative Bayesian approach for nearly automatic liver segmentation: algorithm and validation" in *International Journal of Computer Assisted Radiology and Surgery*, Volume 3, Number 5, November 2008 by Freiman et al. These authors describe an algorithm for segmenting the liver organ in thoracic CT (computed tomography) medical volume images.

Applicants have noted that noise levels in the CT image make this type of approach unusable.

The method described by Rudin, Osher, and Fatemi in the article "Nonlinear total variation based noise removal algorithms" published in *Proceedings of the Eleventh Annual International Conference of the Center for Nonlinear Studies on Experimental Mathematics: Computational Issues in Nonlinear Science* (1992), pp. 259-268 attempts to compensate for noise in the CT image. However, the resulting liver segmentation maps produced can be over-segmented, often including substantial regions of non-liver tissue.

A contrast agent can be administered to the patient, and can be relevant to the imaging processing algorithms for segmentation of the liver and other organs in CT exam images.

The information that is available from segmentation of the liver and other organs includes information on the overall volume of the organ. Quantification of liver volume can be particularly valuable information for the diagnostician. The size of the liver can change over a period of time and can indicate various disease conditions, for example. However, computation of the liver volume requires accurate segmentation and it has proved difficult to obtain repeatable results. One problem that affects volume computation relates to image contrast and the contrast-to-noise ratio (CNR). Segmentation can have less accuracy where contrast is poor. Even where a contrast agent is used, volume computation can be difficult and results less accurate, since the most useful series of images of the liver, in a particular case, may not be those for which contrast is enhanced using the contrast agent.

Thus, it can be appreciated that there is a need for an improved image processing method for segmentation of the liver and other organs and for volume computation based on the achieved segmentation.

SUMMARY OF THE INVENTION

It is an aspect of the present invention to address the need for an improved volume computation method for the liver and other anatomical organs for diagnostic imaging applications.

A further aspect of the present invention is to provide a variable segmentation method that provides information that can be used for volume computation, with or without contrast agents.

These aspects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

According to aspects of the present invention, there is provided a method for providing a calculated volume data value for an organ of a patient, the method comprising: acquiring image data for a first volume image series and for at least a second volume image series for the patient; displaying the first volume image series; responding to an instruction to generate the volume data value by: (i) identifying a seed point in the first volume image series; (ii) correlating the seed point to the second volume image series; (iii) segmenting the organ in at least the second volume image series according to the correlated seed point; (iv) calculating the volume data value for the organ using at least the segmented second volume image series; and displaying the calculated volume data value.

DETAILED DESCRIPTION OF THE INVENTION

Figure 1:
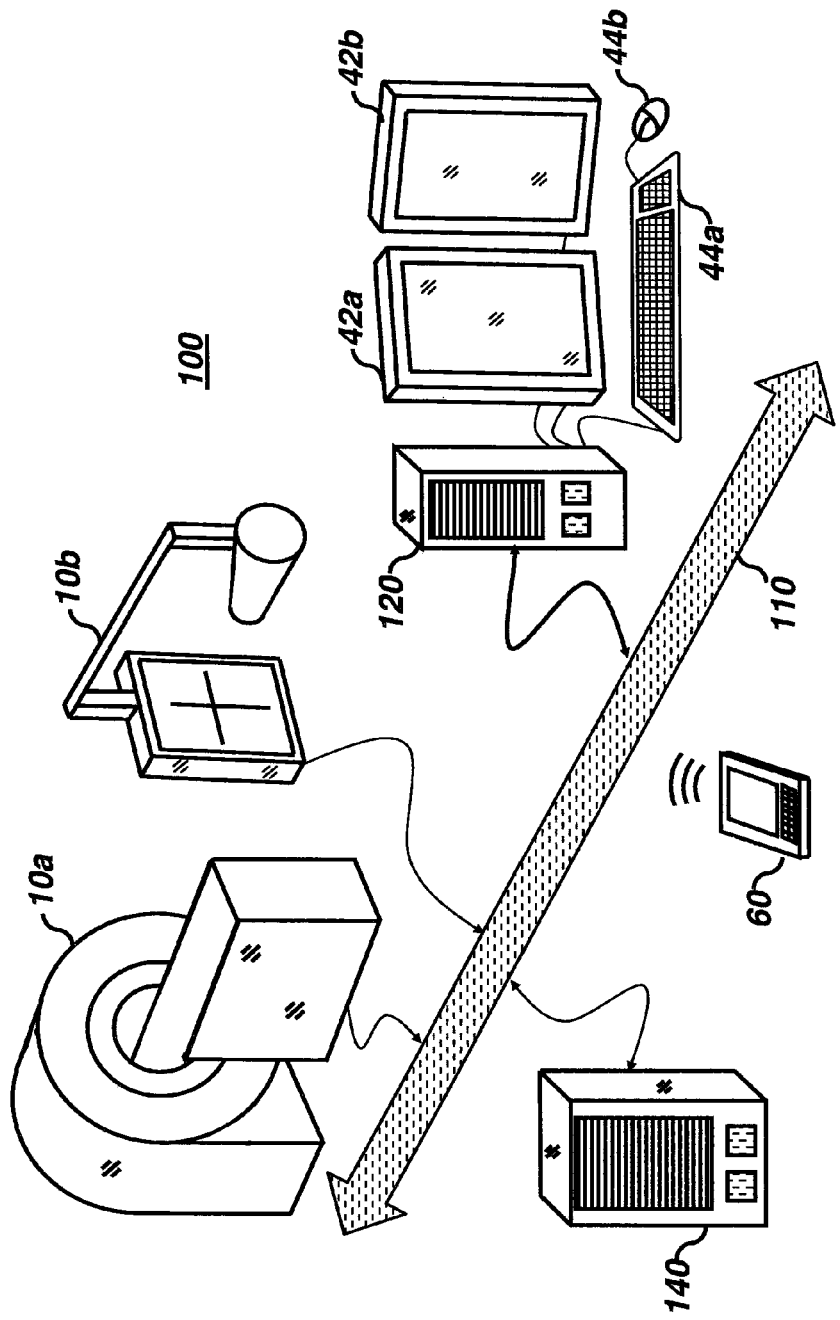
FIG. 1 is a diagram showing a medical imaging communications network of connected computers suitable for practicing the present invention.

Medical imaging applications can be implemented via a picture archiving and communications systems (PACS). These systems provide a way for displaying digital images acquired using a wide variety of medical imaging modalities such as, but not limited to, projection radiography (x-ray images), computed tomography (CT images), ultrasound (US images), and magnetic resonance (MR images). Each of the above mentioned medical imaging modalities contain slightly different diagnostic information. In particular, CT and MR images when viewed and studied by a radiologist, can reveal much detail about a patient's 3-dimensional internal anatomy. To enhance the rendering of diagnostic information, computer algorithm technology can also be applied to the medical image data. This can help to detect an abnormal condition, i.e., using computer aided detection (CAD), and can help to make measurements relating to the patient's condition, i.e., computer aided measurement (CAM).

The present invention provides an algorithmic computer method for computing and reporting the volume of an organ in a medical image. An intended use for the technology described herein is as follows. A radiologist reviews a thoracic CT exam on a medical PACS and indicates to the CAM segmentation software the position of an organ of interest. The voxel position indicated may represent a seed point or starting point assumed to be part of the organ of interest. The CAM segmentation software then identifies voxels surrounding and contiguous with the seed point that are part of the organ of interest. Once the region associated with the organ of interest has been segmented, a corresponding volumetric size can be readily calculated. This information can help in patient diagnosis and treatment since changes in liver volume can be used to assess patient health.

In the following description, an embodiment is described as a software program. Those skilled in the art will recognize that the equivalent of such software can also be constructed, in whole or in part, in hardware. Since image processing and manipulation algorithms and systems are well known, the present description is directed in particular to algorithms and systems forming part of, or cooperating more directly with, the method in accordance with the present invention. Other aspects of such algorithms and systems, and hardware and software for producing and otherwise processing the image signals involved therewith, not specifically shown or described herein, can be selected from systems, algorithms, components, and elements known in the art. Given the description as set forth in the following specification, implementation can use conventional software and techniques known to those skilled in the programming arts.

In the context of the present disclosure, the term "volume image" is synonymous with the terms "3-dimensional image" or "3-D image". Embodiments of the present invention, although developed primarily for the use of segmenting the liver organ in CT volume images and reporting liver volume, also yields good results for segmentation of other organs, such as the gall bladder and spleen, for example. It should also be noted that, although the technology of the present invention was developed for use with 3-D image data, those skilled in the art will recognize that it is applicable to 2-D image sets as well.

Difficulties with Liver Segmentation

For a better understanding of how the method of the present invention computes the volume of the liver region within a volume image, it is instructive to first consider some of the complexities of liver segmentation and some of the shortfalls of conventional segmentation methods.

Liver lesions can be categorized as hypo-dense or hyper-dense with regard to radio opacity of the lesion relative to the liver parenchyma. Hypo-dense liver lesions appear darker (less x-ray opacity) than liver parenchyma while hyper-dense lesions appear lighter (more x-ray opacity). The use of a contrast agent for liver CT studies is primarily motivated by the differentiation of the liver lesions from the liver parenchyma (healthy liver tissue). In addition, the vascular structure (more x-ray opacity) within the liver is also differentiated more effectively from the liver parenchyma when using a contrast agent.

Embodiments of the present invention take advantage of information that is available from a full series of images typically obtained for the liver. For many liver CT studies, a contrast agent is typically injected into the patient in order to help differentiate the liver parenchyma from other anatomical structures. Then, the patient is imaged at intervals as the contrast agent passes through the liver, typically resulting in three or four individual volume images. One standard sequence of images that may be used for a patient study is as follows:

(i) No-contrast volume image series. The first volume image series is captured prior to injection of the contrast agent. A fluid contrast agent is then injected intravenously following this first image capture series.

(ii) Arterial volume image series. About one minute after injection, a second image series is captured. The one-minute delay allows the contrast agent to work its way through the patient's arterial system.

(iii) Venal volume image series. After another delay, the contrast agent has had enough time to work its way into the hepatic veins and a third image series provides the venal volume image.

(iv) Washout volume image series. After a variable delay time, the contrast agent washes out from the liver. An additional image series can be obtained during this process.

This four-series sequence is not followed in all cases. However, it is a common practice for a liver study to use a contrast agent and to provide a sequence of two or more image series, with their relative timing based on the progress of a contrast agent through the liver.

For a study using a contrast agent, it has been found that different image segmentation techniques prove more successful with one series than with another. Image contrast can be a sizable factor in determining the relative success and accuracy of segmentation routines. Where contrast is too low, different types of tissue can be difficult to differentiate from one another and noise can have a deleterious effect on segmentation. Where contrast is too high, segmentation processing may find it difficult to properly associate different portions of the organ with each other, leading to under-segmentation, for example. Conventional segmentation approaches, for example, may or may not be more successful with images in which the contrast agent is used, or may be more successful with different series, such as for images of arterial (i), venal (ii), or washout (iii) series.

A segmentation method used in one embodiment of the present invention and described following can be used to segment the liver organ for any of the types of captured CT liver images, i.e. the arterial, venal, washout and no-contrast volume image series. In fact, it has sometimes been found that segmentation methods of the present invention often actually perform better on no-contrast images than on images in a series captured with contrast agent. This result is counter-intuitive and unexpected. Detailed description of this segmentation method can be found in commonly assigned U.S.

patent application Ser. No. 12/964,780, filed Dec. 10, 2010, entitled "SEGMENTING AN ORGAN IN A MEDICAL DIGITAL IMAGE" by Gindele, incorporated herein by reference.

Some consider the liver to be a difficult organ in the human body to segment, automatically or manually. This is primarily due to the manner in which the liver organ initially grows. While most organs have a reasonably well defined characteristic shape, e.g. kidney, the liver grows, in part, to fill the available space in the abdominal cavity. As such, the shape of the liver organ is highly variable. A further complicating factor for segmentation relates to resection. Liver cancer is a common form of cancer, since a high percentage of liver cancer is metastatic. Therefore, a fair percentage of patients have a portion of their liver resected (removed by surgery). The resultant shape of the resected liver can be very different from its initial shape. In general, the shape of the liver organ is smooth in the region where it contacts the diaphragm (distal surface) and convoluted for the medial surface portions.

Some conventional segmentation techniques use liver-specific shape information to segment the liver organ. An alternate segmentation approach, described in the commonly assigned co-pending U.S. Patent Application by Gindele noted previously relies, instead, on the relatively homogenous nature of the organ but deals more effectively with changes in tissue texture and noise than do earlier segmentation approaches.

It has been noted that the liver organ regions of captured CT volume images are, in general, not homogeneous. Noise is one factor that corrupts the images, but the addition of a contrast agent can also serve to make regions of the liver organ inhomogeneous with respect to voxel values. As described in more detail subsequently, lesions (cancerous or benign), arteries, and veins are differentiated from the liver parenchyma tissue. However, the liver parenchyma, i.e., the healthy liver tissue, is also inhomogeneous in the absence of noise. Each different section of the liver (canonically, 8 or 9 sections) accepts the contrast agent differently. This can be clearly seen on some CT volume images as a mean shift in the voxel values with a visible boundary between two different sections. In noisy images, the boundary between liver sections can be difficult to detect visually.

A system suitable for practicing the present invention is illustrated in FIG. 1 showing a medical imaging communications network 100 that includes multiple connected computers. Such a network of computers provides a way of sending and receiving information between any two or more connected computers. Medical digital images are generated by imaging a patient (not shown) with a capture device of a particular modality. An image capture device 10a symbolically represents a number of medical digital image modality devices such as, but not limited to, a computed tomography scanning device (CT) or Magnetic Resonance imaging scanning device (MR), both capable of producing 3-dimensional or volume digital images of patient anatomy.

For volume imaging, a patient is positioned on a movable table within the capture device assembly such that the patient can be moved relative to the signal source of the capture device. The capture device receives the signals that have passed through the patient in raw form, processes these signals, and produces a slice digital image. Each slice digital image represents a single cross-sectional, or slice, through the patient anatomy. A slice image series can be generated by successively repositioning the patient relative to the source signal and acquiring other slice digital images relating to different cross-sections through the patient. A slice image series, assembled in proper order, can then be used to represent the full 3-dimensional volume of an imaged patient.

Also connected to a communications network 110 is a digital radiographic (DR) capture device 10b capable of producing digital x-ray images. As such, the images typically produced by a DR capture device are one or more 2-dimensional digital images each representing a different exposure and/or imaging path through the patient. For example, the DR capture device 10b can be used to acquire multiple projection radiographic digital images, with the x-ray source located in a different position relative to the patient for each image. The resulting DR radiographic digital images can be processed to produce a set of tomosynthesis slice digital images that represent a 3-dimensional digital image of the patient.

The slice digital images (not shown) produced by the capture device 10a are transmitted via the communications network 110 to an image archive computer 140 where, along with patient history information, they become part of an electronic patient history record stored in memory. The main function performed by the image archive computer 140 is the facilitation of transfer or exchange of image information rather than the processing of information. The image archive computer 140 serves as a large storage repository of digital images and other unspecified medical information. The arrows in the diagram of FIG. 1 represent the exchange of information, which in general, is bi-directional, with the flow of information in either direction.

The stored slice images are later queried on a diagnostic workstation computer 120, sometimes referred to as a PACS (Picture Archive and Communication System), for viewing and examination by a radiologist or similarly trained medical professional. The diagnostic workstation computer 120 or other type of host processor can have multiple electronic displays connected for viewing medical images. Two such electronic display devices 42a and 42b are shown in FIG. 1. Each display device has a corresponding display buffer that serves as a type of memory for storing the image data that currently displays. This display buffer is provided by workstation computer 120 in one embodiment. Also connected to the diagnostic workstation computer 120 are input devices 44a and 44b depicted here as keyboard and mouse devices respectively. Although the technology of the present invention can be envisioned as operating within the context of a diagnostic workstation computer, it should be noted that any computing device capable of displaying and processing image data can be used. As one example, a mobile computer 60 shown in FIG. 1 can be used with the present invention. Thus, it is not necessary for the computer to be physically connected to the communications network 110.

A PACS (Picture Archive and Communication System) can be defined as a system that acquires, transmits, stores, retrieves, and displays digital images and related patient information from a variety of imaging sources and communicates the information over a network. By this definition, the diagnostic workstation computer 120 shown in FIG. 1 can represent a PACS. Similarly, the combination of the diagnostic workstation computer 120, mobile computer 60, image archive computer 140, and communication network 110 can collectively be considered a PACS. In addition to the patient digital images, PACS transmit, receive, and store other electronic patient record information such as, but not limited to, non-image information (meta-data) such as age, sex, medical history, prescribed medications, symptoms, etc.

For this disclosure, the collection of inter-connected computers including the communications network can be referred to as a DICOM network (Digital Imaging and Communications in Medicine PS 3.3-1999, National Electrical Manufacturers Association, 1999), since DICOM-formatted digital images are a current industry standard and a prevalent file encoding used for medical digital images. Typically, a 3-dimensional volume image is constructed from a set of 2-dimensional slice digital images, wherein each slice digital image is encoded as an individual DICOM file.

Typically, an individual digital image data element, i.e., single value representing a measured image signal intensity, is referred to as a voxel for 3-dimensional volume images and a pixel for 2-dimensional images. The approach of the present invention can be applied to 2-dimensional as well as 3-dimensional images. As such, for the disclosure herein, the terms voxel and pixel can generally be considered equivalent, i.e., describing an image elemental datum that is capable of having a range of numerical values. Voxels and pixels can be considered to have the attributes of both location and value.

It is noted that the term "memory", equivalent to "computer-accessible memory" in the context of the present disclosure, can refer to any type of temporary or more enduring data storage workspace used for storing and operating upon image data and accessible to a computer system. The memory could be non-volatile, using, for example, a long-term storage medium such as magnetic or optical storage. Alternately, the memory could be of a more volatile nature, using an electronic circuit, such as random-access memory (RAM) that is used as a temporary buffer or workspace by a microprocessor or other control logic processor device. Display data, for example, is typically stored in a temporary storage buffer that is directly associated with a display device and is periodically refreshed as needed in order to provide displayed data. This temporary storage buffer can also be considered to be a memory, as the term is used in the present disclosure. Memory is also used as the data workspace for executing and storing intermediate and final results of calculations and other processing. Computer-accessible memory can be volatile, non-volatile, or a hybrid combination of volatile and non-volatile types. With respect to communications network 110 shown in FIG. 1, computer-accessible memory of various types is provided on different components throughout the system for storing, processing, transferring, and displaying data, and for other functions.

With the medical imaging system setup as described above and shown in FIG. 1, a medical professional such as a radiologist (not shown), uses the keyboard 44a or mouse 44b to indicate, to a software application program 150 (shown in FIG. 2) running on the diagnostic workstation computer 120, the desired patient record (not shown) to be loaded into memory. The CT digital image exam, i.e., the set of CT slice digital images, is then retrieved from the image archive computer 140 and displayed on the electronic display devices 42a and 42b. After viewing the image data, the medical professional indicates to the system the location of a suspected pulmonary lesion with a click of the mouse, input device 44b, or other suitable pointing device. Typically the viewing operation is performed by scrolling through the 2-dimensional slice digital images, one at a time, and viewing the slice digital image that best shows the suspected pulmonary lesion.

Embodiments of the present invention provide a method for automatically computing the volume of a segmented organ or other feature in a volume image, such as the volume of the liver or other organ. The segmentation process initially generates a smoothed image from the volume image, with or without a seed point indicated, then forms a core segmentation of the volume image according to the smoothed image. The core segmentation that has been generated includes voxels that have a high probability of belonging to the liver or other anatomical organ of interest. The size of the core segmentation of the volume image is then increased in order to form the segmented region for the liver or other anatomical organ according to data obtained from the core segmentation. The resulting segmented region can then be used to compute the volume of the segmented organ and segmentation results and volume value can be displayed.

Figure 2:
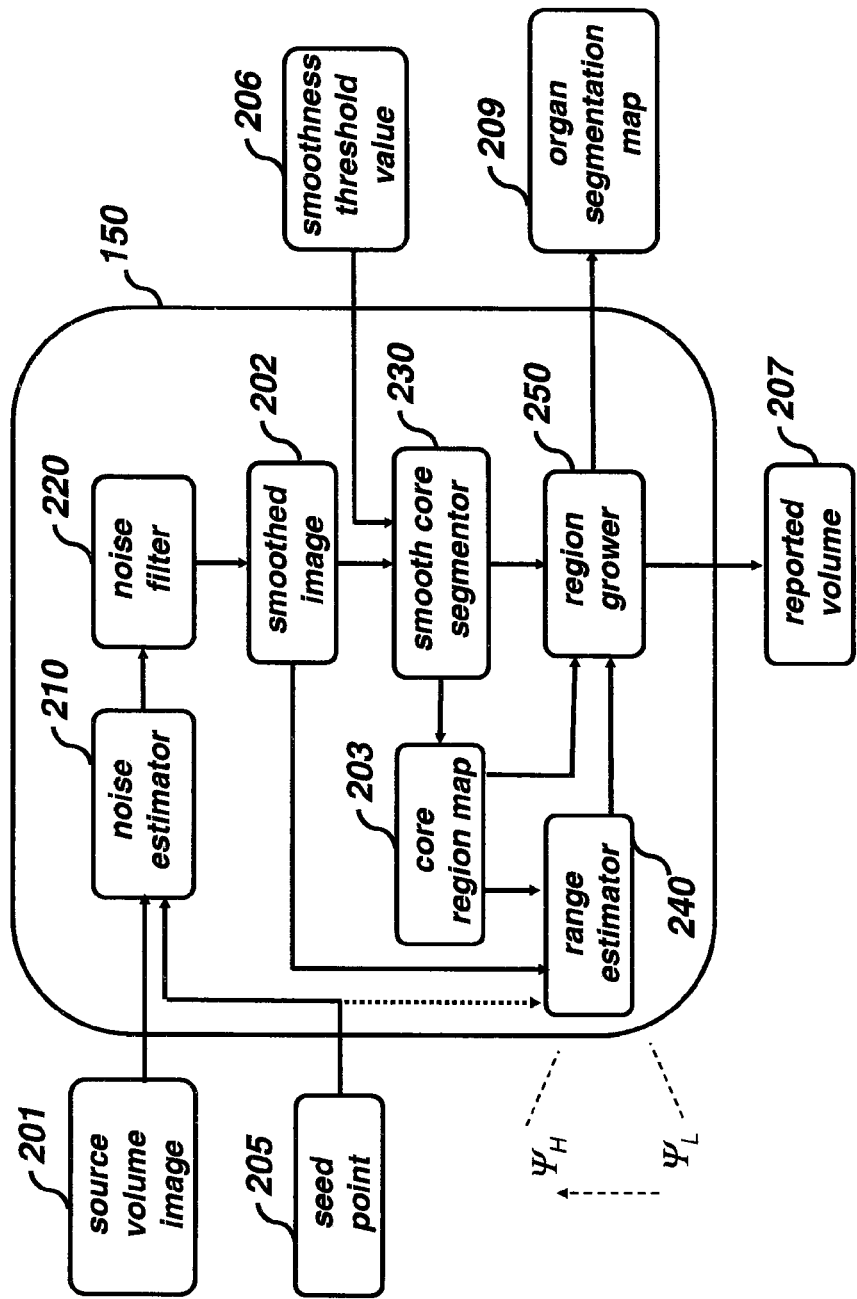
FIG. 2 is block diagram showing the details of the software program running within the diagnostic workstation computer.

An overview of the flow of image information into, out of, and within a software application program 150 that executes organ segmentation on diagnostic workstation computer 120 of FIG. 1 is depicted in FIG. 2. The software application program 150 receives a set of source digital images in the form of axial CT slices that constitutes a source volume image 201, a seed point 205, and a smoothness threshold value 206 as input. In one embodiment, the user of the system supplies the seed point 205 after reviewing the source volume image 201 and selects a point within the liver or other organ-of-interest. The noise estimator 210 receives the source volume image 201 and the seed point 205, samples the values within a domain about the seed point 205, calculates a value for the expected noise magnitude corresponding to the organ of interest and sends this estimate of noise magnitude and the source volume image 201 to the noise filter 220. The noise filter 220 uses the expected noise magnitude value and the source volume image 201 to generate smoothed image 202. The main purpose of the noise filter 220 is to reduce or, if possible, remove all traces of the stochastic components of variation in the source volume image 201 and some image texture as well. The smoothed image 202 is received by the smooth core segmentor 230 and produces a core region map 203. The task it performs is regulated by the received smoothness threshold value 206. The core region map 203 represents a region that usually includes the core, or central, region of the intended organ-of-interest, also termed a first segmentation. The core region map 203 is received by the range estimator 240 that calculates a high and low characteristic value by sampling the values of the smoothed image 202 within the domain indicated by the core region map 203 that corresponds to the organ-of-interest. The region grower 250 receives the core region map 203 and the high and low characteristic values and produces an organ segmentation map 209 that is stored in memory and provides an expanded segmentation. It also uses the organ segmentation map 209 to calculate the corresponding reported volume 207 (typically in cubic mm) for the organ-of-interest.

Noise Estimator 210 Function

The noise in CT images varies depending on factors such as the x-ray radiation dose given the patient during image capture and size of the patient. In the process flow of FIG. 2, noise estimator 210 calculates a value as the estimate of the noise magnitude in a volume image in the vicinity of the seed point 205. A predetermined sized volume sampling region is centered about the seed point 205. Through experimentation, it has been found that good results can be obtained by using a region corresponding to 50 mm by 50 mm in the XY plane and 15 mm in the Z direction. The noise magnitude estimate is computed by calculating the difference between the value of the voxel of interest and a voxel value located a lag distance away from the voxel of interest. For convenience, the direction of the lag is chosen to be two voxel units away in the X direction. The difference value is calculated for all voxels within the predetermined volume sampling region. Lag distances other than two will also yield acceptable results.

The noise magnitude estimate is calculated as the mean of the absolute value of the sampled difference values. This figure of merit is a surrogate for calculating the standard deviation of the noise magnitude. The present invention will work with other methods of estimating the noise magnitude such as calculating the standard deviation of values directly. The main advantage of using the average of absolute value differences approach, versus calculating the standard deviation of voxel values directly, is in not having to calculate the mean value of the local region.

In the processing shown in FIG. 2, a significant function of the noise estimator 210 is to produce a usable estimate of the stochastic variation in the source volume image 201. The present invention can alternately be used with other methods designed to estimate image noise magnitude such as the method disclosed in U.S. Patent Application No. 2003/0215155, entitled "Calculating noise estimates of a digital image using gradient analysis" by Navid et al., for example.

Noise Filter 220 Function

Using the process described herein, acceptable organ segmentation results can be produced even when working with extremely noisy images. The noise filter 220 iteratively applies a noise reduction algorithm to the source volume image 201, using spatial filtering to effect a reduction in stochastic variation in the processed image, i.e. the smoothed image 202. An embodiment of the present invention uses the noise reduction algorithm described in U.S. Pat. No. 6,681,054 entitled "Noise reduction method utilizing probabilistic weighting, apparatus, and program for digital image processing" to Gindele. In summary, for a given voxel of interest, a noise-free voxel estimate is calculated by first calculating an estimate value for each of four local regions about the voxel of interest within a particular plane. These regions are 3 by 1 voxels in size and are oriented, within the plane, in four different directions: one horizontal, one vertical, one at plus 45 degrees, and one at minus 45 degrees. Each of the four local regions includes the voxel of interest. The median value of each of these four local regions is calculated to form the four estimate values. The value of the voxel of interest forms a fifth estimate value. A weighted average of the five estimate values forms the final noise-free estimate value for the voxel of interest. The weighted average of the five estimate values is performed by a Gaussian weighting function wherein the standard deviation of the Gaussian function is given by a multiple ($\lambda$) of the noise magnitude estimate. A suitable value for the parameter $\lambda$ is 5.0. This procedure is performed on each voxel in the source volume image 201 wherein the voxel values of the smoothed image 202 are formed from the noise-free estimate values.

The noise reduction algorithm described above and used to generate smoothed image 202 in FIG. 2 is a 2-dimensional algorithm, i.e., it is applied to a 2-dimensional image. However, the organ-of-interest is a 3-dimensional object. Although the above-described noise reduction algorithm can easily be extended to three dimensions, the present invention uses the computationally efficient implementation of the 2-dimension noise reduction algorithm in a successive manner to achieve the reduction of noise. In particular, the 2-dimensional noise reduction algorithm is first applied to each of the axial slices (XY-plane slices of the source volume image 201). Optionally, the noise reduction algorithm is then applied to each of the coronal slices (XZ plane slices of the source volume image 201) and then optionally to the sagittal slices (YZ plane slices of the source volume image 201). Typically with the $\lambda$ parameter set to 5.0, the resulting stochastic variability in the smoothed image 202 is about 40% less than in the source volume image 201. On visual inspection, the smoothed image 202 retains almost all of the structural edge content of the source volume image 201 but has significantly less noise. The three-step processing of axial, coronal, and sagittal filtering is considered a single pass of the noise reduction algorithm. It should be noted that within one pass of the noise reduction algorithm, any one of the three applications of the noise reduction algorithm can be omitted. For example, just the axial planes can be processed or just the axial and coronal planes can be processed and still yield acceptable noise filtration.

Iterative Processing for Noise Reduction Algorithm

In general, for good performance of organ segmentation, it is often necessary to perform more than one pass of the noise reduction algorithm. Typically, five passes of the noise reduction algorithm provide a smooth enough image to yield good segmentation results. In this regard, the present invention produces smoothed images 202 that have had more than just the noise in the original image removed. In fact, after five passes, the resulting smoothed image 202 also has some structural anatomy removed as well as noise content. For the case of segmenting the liver organ, it has been found that the segmentation processing actually works best if the structural edges corresponding to the veins and arteries within the liver organ are suppressed or removed by the noise filtering operation.

The inherent noise magnitude in the source volume image 201 is typically on the order of 15 to 20 HU standard deviation for a typical CT thoracic study. However, for low-dose CT studies, the standard deviation of the noise can be 50 HU or higher. As an alternative to processing a fixed number of times, such as executing 5 successive passes or iterations of the above noise reduction algorithm, the number of passes of the noise filtering operation can be made variable. For this implementation of the present invention, the noise estimator 210 is employed after each pass of the noise reduction algorithm. When the measured noise estimate (estimated standard deviation) that is sampled from the smoothed image 202 falls below a pre-determined threshold ($\epsilon$), the noise filtering is stopped. This last noise estimate, lying just below the threshold value, is referred to as the residual noise estimation value. A suitable value for the parameter $\epsilon$ is between 1.0 HU and 2.0 HU. This condition works well for segmenting the liver organ. When segmenting other organs that have inherently smooth interior structure, as compared with the liver organ, a higher value of $\epsilon$ will provide excellent segmentation results. For example, when segmenting the spleen organ or gall bladder organ, a value of 5.0 HU can be used.

Experimentation confirmed that the present invention can yield good organ segmentation results when using other noise filters. In particular, good segmentation results were obtained by obtaining smoothed image 202 using the noise reduction algorithm disclosed by Rudin, Osher, and Fatemi in the article "Nonlinear total variation based noise removal algorithms" published in *Proceedings of the eleventh annual international conference of the Center for Nonlinear Studies on Experimental mathematics: computational issues in nonlinear science* (1992), pp. 259-268.

Contrast agents are often used when imaging the liver and can serve as an aid to liver segmentation when using conventional segmentation techniques. Because of the inherent difficulties in identifying liver tissue, conventional segmentation techniques have been shown to be less successful where no contrast agents are used.

By comparison, the method described with reference to FIG. 2, when applied to no-contrast volume images (that is, to images in which there is substantially no visibly perceptible trace of contrast agent), performs well. For these captured volume images, the lesions (hypo-dense and hyper-dense) are often difficult for observers to see, since their mean voxel values are very close to the voxel value for the liver parenchyma. For some liver exam CT data, the lesions can be differentiated from the liver parenchyma tissue by less than 6

HU. Some no-contrast volume images have a parenchyma-to-lesion mean voxel value difference of as much as 15 HU. The application of the noise reduction algorithm servers to smooth out the subtle variations of the component tissue parts of the liver organ for no-contrast volume images. After noise filtering, the magnitude of the variation within the component regions is very low, i.e. the lesion and parenchyma tissue regions. However, the difference in mean voxel value between component regions remains.

Segmentation methods described herein, when applied to contrast-aided volume images, that is, to CT volume images captured following the injection of a contrast agent, usually perform well with regard to segmentation of the liver organ region. However, if the contrast agent uptake in the liver is particularly high, the difference in voxel value between the liver parenchyma and hypo-dense lesions can be 70 HU or greater. This difference can be great enough to confound segmentation processing so that only the liver parenchyma is segmented and not the regions corresponding to hypo-dense lesions. For these cases, the estimate of liver volumetric size can be less than the actual size of the liver organ.

Contrast-aided volume images, i.e. arterial and venal volume images, have much higher voxel differences between the lesion and parenchyma tissue regions as compared with the washout volume images and no-contrast images. For some images, the mean voxel differences can be in the range of 60 to 70 HU. In general, the present invention is suitable for organs or objects within volume images where the object to be segmented has less inherent combination of stochastic and structural variability. Some liver organs within contrast-volume images yield good segmentation results with the present invention. As noted previously, however, an even higher percentage of good segmentation results are achieved with no-contrast volume images.

Improved segmentation results can be obtained with the technology of the present invention if the noise filtering parameter $\lambda$ is adjusted on the basis of the level of contrast agent that is administered to the patient being imaged. Alternatively, the number of passes of the noise filtering operation 220 in FIG. 2 can be adjusted on the basis of the level of contrast agent. Consequently, the value of the noise filtering parameter $\lambda$ should be higher for the arterial and venal volume images and less for the no-contrast and washout volume images as part of a contrast agent administered organ examination. Consistent with an embodiment of the present invention, the value of $\lambda$ for no-contrast volume images is roughly one half the value used for arterial volume images. Alternatively, the method described above, wherein the noise filtering is successively performed until the calculated noise estimation magnitude falls to within a value $\epsilon$, will also work to increase the degree of noise filtration in response to the voxel variation induced by the contrast agent. The method of varying the parameter $\lambda$ with a fixed number of noise filtering operations and the method of varying the number of noise filter operations until the measured variability falls to a prescribed value are both examples of varying the noise filtering operation in response to the level of contrast agent administered to the patient.

Smooth Core Segmentor 230

Referring to FIG. 2, the next step in processing is performed by the smooth core segmentor 230. An aspect of the operation of the smooth core segmentor 230 is the differentiation, or segmentation, of the region that is spatially smooth in the proximity of the seed point 205. The smooth core segmentor 230 applies a spatial smoothness criterion to the voxels of the smoothed image 202 resulting in a core region, represented as a core region map 203. There are a number of possible smoothness criterion operators that can be applied to an input image. One embodiment of the present invention uses a spatial operator that calculates the minimum and maximum voxel values within a prescribed region about a voxel of interest. That is, for a 3 by 3 by 3 voxel region about a voxel of interest, the minimum and maximum voxel values are recorded. The difference between the maximum value and the minimum value represents a relative degree of smoothness, that is, of spatial activity, for the voxel of interest. This smoothness difference value is then compared to a predetermined smoothness threshold value $\Delta$ that is empirically determined. Voxels with a calculated smoothness difference value less than or equal to smoothness threshold $\Delta$ are considered as "spatially smooth" and are included in the core region map 203. If this criterion is not met, the voxel is considered to lie outside the core region map 203.

The present invention can be practiced with other methods for calculating and applying a smoothness criterion. Alternatively, for example, the local spatial gradient can be calculated about the voxel of interest. The absolute value of the calculated spatial gradient can then be compared to the predetermined smoothness threshold value $\Delta$ to produce the core region map 203.

Seed Point Not Within the Core Region

The core region map 203 as described with reference to FIG. 2 may or may not include the seed point 205 previously obtained from a viewer. It is a useful aspect of the present invention that the saved spatially smooth region identified in the core region map 203 correspond to the user's intent. Recall that the user typically supplies the seed point 205 to indicate the organ, and region, of interest. When the application of smoothness criterion, as described above, results in a core region map 203 that does not include the seed point 203, the location of the seed point is relocated to the location within the core region map 203 that is geometrically closest to the original seed point. This new seed point is also referred to as seed point 205. Thus after this seed point relocation processing, seed point 205 is guaranteed to be within the core region map 203.

Morphological Operations

The operation of the smooth core segmentor 230 described above can optionally be enhanced by applying morphological operations to the core region map 203. In particular, an erosion operation can be used to break the connectedness of the core region map 203 with non-organ tissue regions. In one embodiment, erosion is performed with a morphological kernel element that is approximately 13 voxels in diameter.

The resulting map from an erosion operation is smaller than the original region map 203. Much of the region lost to the erosion operation can be regained with a subsequent constrained dilation operation. In this operation, the region map in process is dilated with a morphological kernel element approximately 19 voxels in diameter. A constraint is placed on the dilation operation, so that no voxels can be added to the final core region map unless those same voxels were contained within the original core region map 203. The net effect of the erosion/constrained dilation operations is to break the connection between the core region map and tissue that lies outside of the organ of interest, while maintaining most of the organ-of-interest tissue of the original core region map.

Range Estimation

The purpose of the range estimator 240 in the process of FIG. 2 is the calculation of two voxel values, a high characteristic value $\Psi_H$ and a low characteristic value $\Psi_L$ that represent the range of voxel values corresponding to the organ-of-interest. Both characteristic values are sampled from the smoothed image 202 within the region defined by the core region map 203 as follows. The extreme values are found (maximum and minimum) and a range-stretching value Ω is added to and subtracted from the maximum and minimum, respectively, to produce the respective high characteristic value and low characteristic value. Thus the high characteristic value $\Psi_H$ is given by the maximum plus $\Omega_H$ and the low characteristic value $\Psi_L$ is given by the minimum minus $\Omega_L$. The value of the parameters $\Omega_H$ and $\Omega_L$ accounts for the inclusion of voxels that are slightly outside the range of voxel values identified by the minimum and maximum, to account for some voxel value variability. Although various positive and negative values for Ω can be used to obtain acceptable results, the optimum values for $\Omega_H$ and $\Omega_L$ were found experimentally to be 3 and 15 respectively.

Region Growing

The region grower 250 in the process of FIG. 2 uses the range defined between $\Psi_H$ and $\Psi_L$ as one of the criteria to produce an organ segmentation map 209. Another criterion that is used relates to the geodesic distance of voxels from the core region map 203. Referring to the 2-D representation in FIG. 3, an example first segmentation is shown by the locus of points contained within the dotted line of a core region map 303 and with a starting point 310. The corresponding organ segmentation map 309 is generated with an expanded segmentation region, all voxels within the boundary indicated by the solid line indicating organ segmentation map 309 are part of the expanded segmentation that is obtained by region growing, beginning from the first segmentation, core region map 303. Location 305 represents a zone, or local region of voxels, where the voxel values of the smoothed image 202 (not shown in FIG. 3) have values bounded by $\Psi_H$ and $\Psi_L$ and are also within a propagation distance Γ (shown as line 304) of the core region map 303. Location 307 corresponds to a zone where the voxel values of the smoothed image 202 that lie outside the core region map 303 are not bounded by $\Psi_H$ and $\Psi_L$ but lie within the specified criterion propagation distance Γ. Experimentation with liver organ segmentation examples has shown that an optimal value for the predetermined propagation distance Γ is 4 voxels. However, acceptable results were obtained with other values of Γ as high as 10. For organs other than the liver, the value of distance Γ can be experimentally determined to obtain optimum segmentation results.

Geodesic vs. Geometric Distance

Figure 4A:
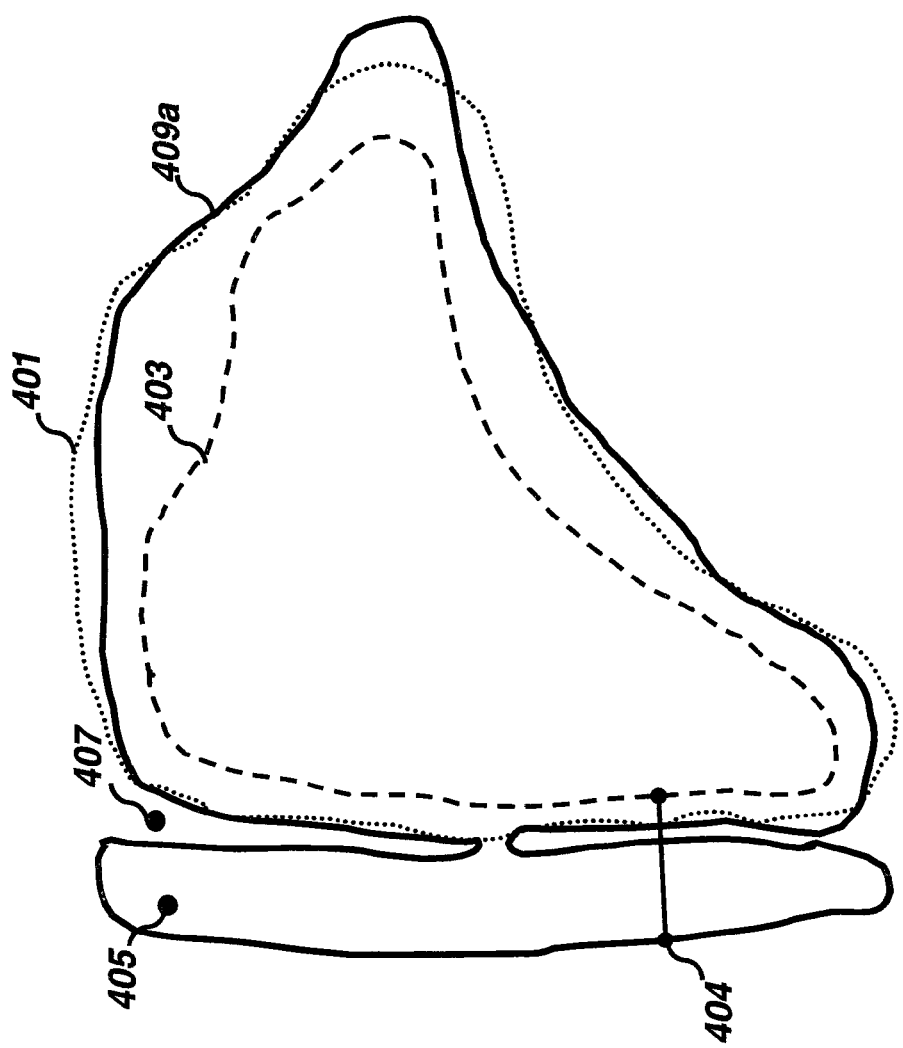
FIG. 4A is diagram showing an example segmentation map produced with a geometric distance criterion.

Embodiments of the present invention use geodesic distance rather than geometric distance, or Euclidian distance, as a criterion for region-growing a core region map 203 in order to produce an organ segmentation map. To illustrate the difference between a geometric and geodesic distance, refer to FIG. 4A. The dotted line indicated by item 401 represents the true boundary of the organ-of-interest. Item 403 represents a core region map while item 409a represents the corresponding organ segmentation map that would result if a geometric distance criteria were used within the region grower 250 of FIG. 2. Line 404 represents a geometric distance from the boundary of the core region map 403. Region 405, which is not part of the organ-of-interest, is included in the organ segmentation map 409a since the voxels in that region both satisfy the voxel range criterion and are within a geometric distance from the boundary of the core region map 403. Voxel region 407 corresponds to a region that is within the geometric distance of core region map 403 but has voxel values that are outside the intensity range indicated by the values $\Psi_H$ and $\Psi_L$.

Figure 4B:
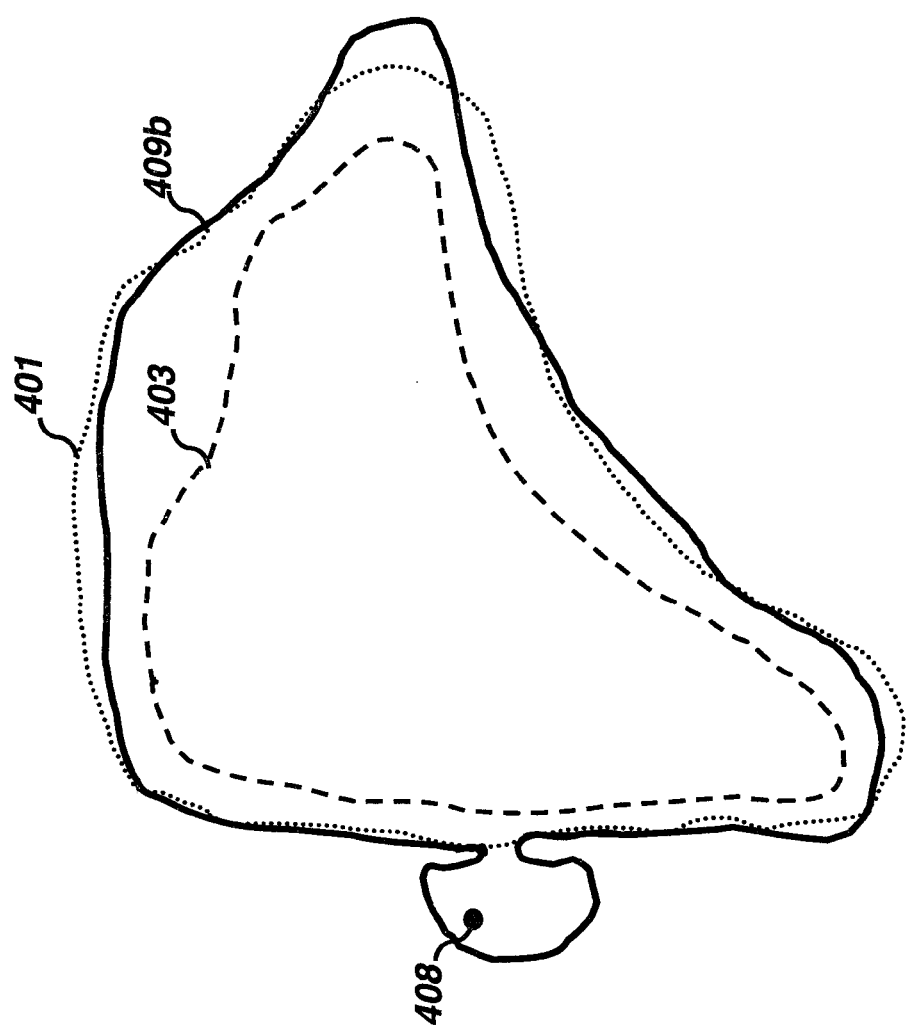
FIG. 4B is diagram showing an example segmentation map produced with a geodesic distance criterion.

In contrast, FIG. 4B shows processing of the same volume image data using a geodesic, or path length, distance. Starting with the same core region map 403, the corresponding organ segmentation map 409b is produced by region growing using the geodesic distance criterion. The dotted line indicated by boundary 401 again represents the true boundary of the organ-of-interest. Region 408 represents an error in segmentation, since that region corresponds to tissue that is not part of the organ-of-interest. However, region 408 shown in FIG. 4B represents a smaller error in segmentation than region 405 shown in FIG. 4A.

It is noted that the core region map 203, described with reference to FIG. 2, is calculated as a 3-dimensional quantity. The example core region map 303, shown in FIG. 3, is depicted as a 2-dimension closed curve for illustration purposes and represents the cross-sectional shape of a core region map in a plane, e.g. axial, coronal, sagittal, or any other arbitrarily oriented plane.

There are ways that a distance criterion can be applied to a starting region map. For example, one embodiment of the present invention uses the method described by J. A. Sethian in *Level Set Methods and Fast Marching Methods*, Cambridge University Press, 1999. This includes initializing a fast-marching method with the boundary voxels of the core region map 203. A binary cost function is calculated as the threshold criterion defined by the parameters $\Psi_H$ and $\Psi_L$ as described above. As part of a binary cost function fast-marching method, new voxels are added to the initial region if they meet the cost function criterion. With each annex of voxels within the fast-marching method, the geodesic distance from the initial region is calculated. The region growing process stops when the calculated geodesic distance exceeds the constraint given by the specified propagation distance criterion Γ.

Figure 3:
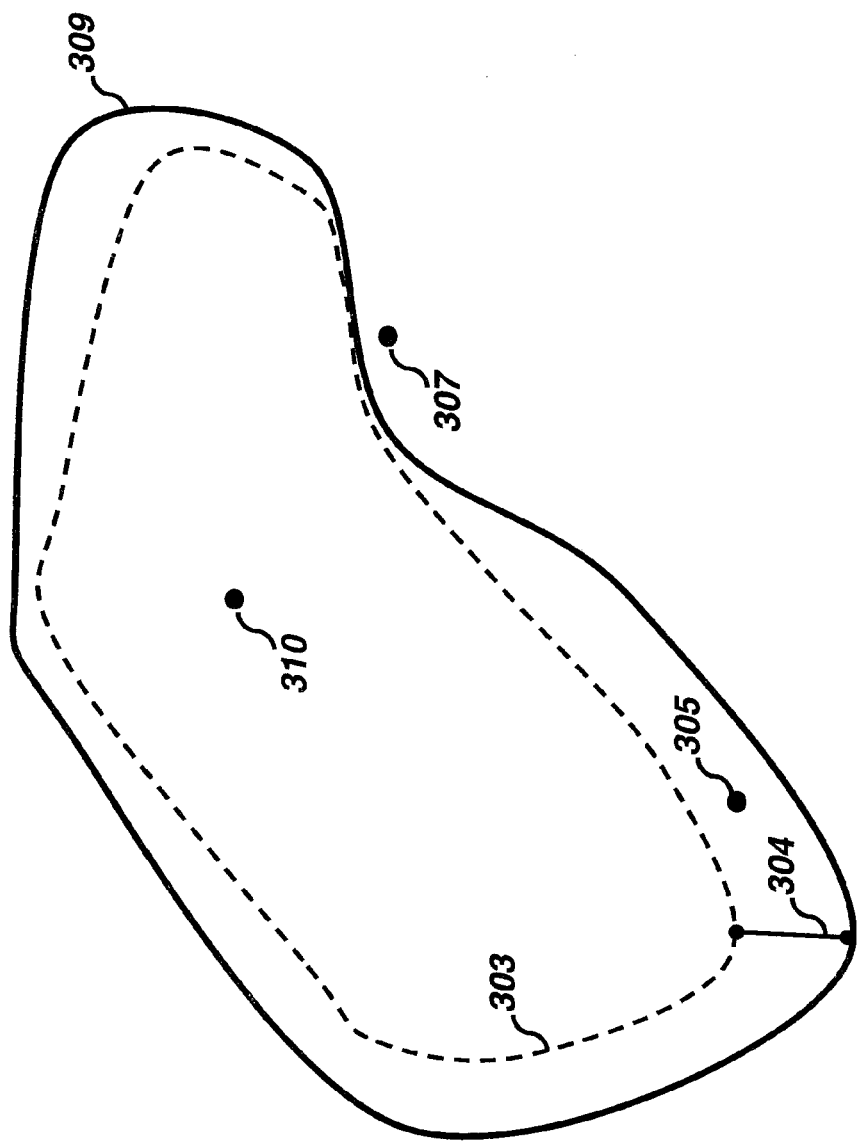
FIG. 3 is diagram showing an example segmentation map.

The core region map 203 of FIG. 2 and example core region map 303 shown in FIG. 3 are also segmentation maps and could be considered as candidates for an organ segmentation map 209. However, the present invention has been configured, for optimum results, to produce core region maps that tend to under-segment the organ-of-interest. That is, the typical core region map that is produced is intentionally somewhat smaller that the ideal region corresponding to the organ-of-interest. The region grower 250 is then used to enlarge the core region map in order to generate an expanded segmentation region using the two criteria:

(1) voxel value range as indicated by parameters $\Psi_H$ and $\Psi_L$; and (2) propagation distance from the boundary of the core region map as indicated by parameter Γ.

The region growing process is motivated by an analysis of the physical expression of voxel values corresponding to organs in the body. Some, but not all, organs in the body can be characterized as having a relatively homogeneous tissue radio-opacity at their core. However, the organ tissue often has less radio-opacity near the boundary of the organ for two reasons: (1) partial volume effects and (2) lower contrast uptake. For volume images where the patient is administered a contrast agent, the volume image will generally exhibit more radio-opacity (higher HU voxel values) in regions of tissue that have a correspondingly higher blood supply. The contrast agent is usually designed to be more radio-dense than water and blood. Consequently, at the boundary of the organ-of-interest there can be less contrast agent uptake.

In addition to this lowered intake effect, organs such as the liver often contact internal fluids along their boundaries. These internal fluids are usually less radio-dense than the solid tissues associated with the organ-of-interest. As a consequence, the voxel values at the boundary of an organ can be significantly lower due to partial volume effects. To help compensate for this, the parameter $\Omega_L$ is primarily set to a larger value than $\Omega_H$ to take advantage of the lower radio-opacity near the boundary of organs.

Multi-Resolution Processing

The above described organ segmentation algorithm, outlined in FIG. 2, can be applied to a volume image of any dimension or resolution sampling. In one embodiment, the present invention applies the organ segmentation algorithm to different resolution levels of a Gaussian pyramid. This is accomplished by forming one or more lower resolution versions of the source volume image 201. Starting with the source volume image 201 a first lower resolution volume image is calculated wherein each voxel of the lower resolution volume image is calculated by averaging the voxel values from an N by N by M (xyz) block of voxels from the source volume image 201. The parameters N and M are chosen such that effective voxel dimensions, in physical units, of the first lower resolution volume image are as close to isotropic as can be obtained for integer values of N and M.

The above described organ segmentation algorithm is applied to the lower resolution volume image and a corresponding lower resolution organ segmentation map is produced. The XYZ dimensions and location of the lower resolution organ segmentation map within the corresponding lower resolution volume image are calculated. That is, the minimum and maximum values for the X, Y, and Z coordinates are calculated by analyzing the domain of voxels classified as organ voxels. These lower resolution minimum and maximum values for the X, Y, and Z coordinates are then interpolated up to the full resolution source volume image 201 in order to yield a volume-of-interest. This volume-of-interest represents a sub-volume, or set of voxels with the source volume image 201. Next the organ segmentation algorithm described above is applied to the voxels of the volume-of-interest.

Since the size of the volume-of-interest is smaller than the size of the entire source volume image 201, the overall processing time to calculate the organ segmentation map 209 is greatly reduced with processing at lower resolution. In general, the present invention works better on the full resolution image data than on the lower resolution image data. Therefore, since there can be errors in the segmentation processing, the dimensions of the volume-of-interest are expanded by approximately 20% to ensure that the organ-of-interest is bounded.

Figure 5:
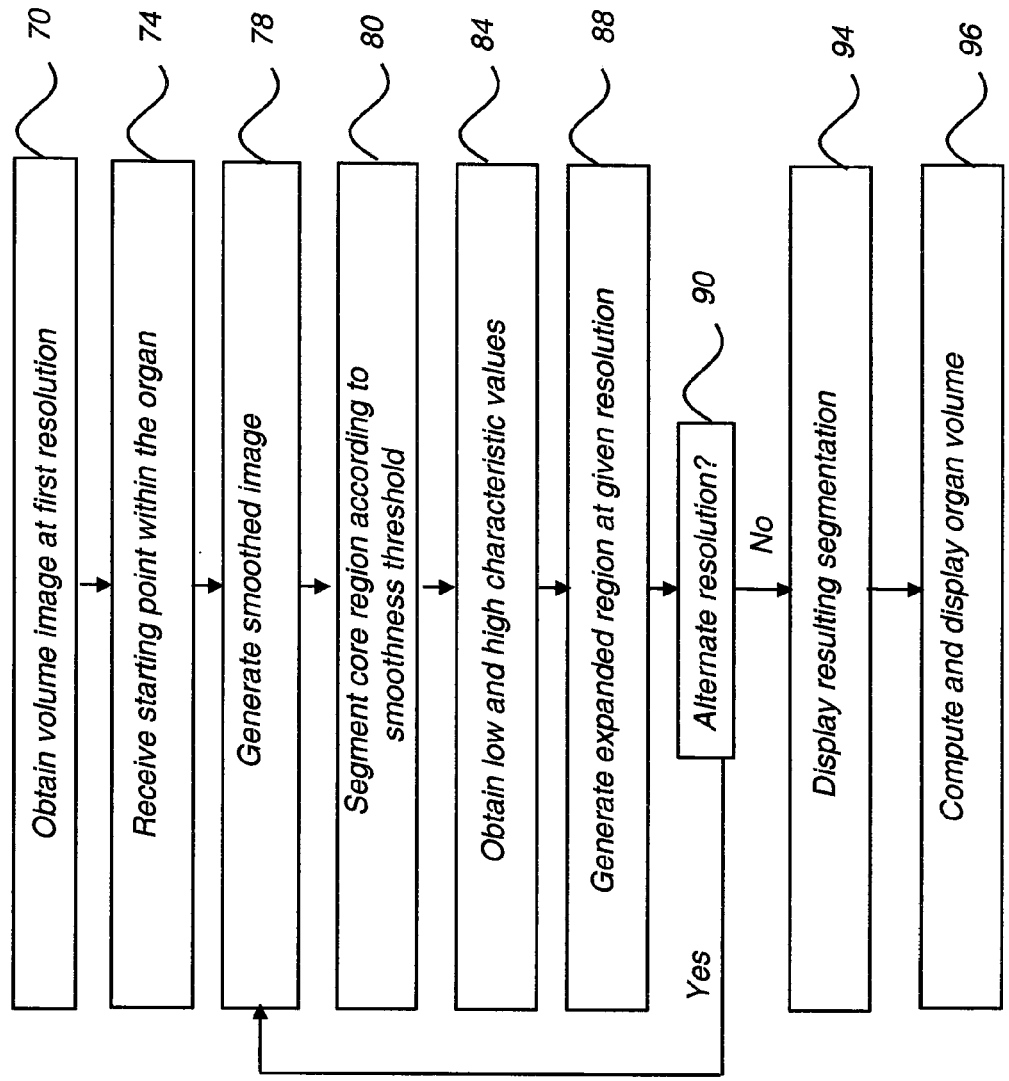
FIG. 5 is a logic flow diagram that shows processing steps used for volume image segmentation at one or more imaging resolutions.

The logic flow diagram of FIG. 5 shows how the processing steps of the present invention can be executed with the volume image generated at one or more different resolutions. The volume image is obtained, at a given resolution, in an obtain image step 70, optionally along with information related to the use of a contrast agent. In a receive starting point step 74, a seed point is identified, either by a practitioner or other user, or by another image processing system that provides this location as data. A human viewer may provide this starting point information as pixel or voxel coordinates using a mouse or other suitable on-screen pointer. A related image processing system may provide starting-point pixel or voxel coordinates as data, as a result of image analysis. In a generate smoothed image step 78, an image smoothing algorithm is applied to the image data, such as using iterative noise reduction algorithms as described previously, to generate smoothed image 202. Then, in a segment core region step 80, core region map 403 is generated. An obtain characteristic values step 84 computes the high characteristic value $\Psi_H$ and low characteristic value $\Psi_L$ that represent the range of voxel values corresponding to the organ-of-interest. Given core region map 403 and the high and low characteristic values $\Psi_H$ and $\Psi_L$, along with an empirically predetermined propagation distance parameter $\Gamma$, as noted previously, an expanded segmented region corresponding to organ segmentation map 209 is then generated and stored in a generate expanded region step 88. A looping step 90 tests to determine whether or not this processing takes place over multiple resolutions. If multiple resolutions are used, processing repeats from generate smoothed image step 78, using the alternate resolution image and the assigned seed point. After image processing at all desired resolutions is completed, results are compiled, combined, and stored, then displayed in a display results step 94. In one embodiment, the display provides an outline overlaid onto the volume image as displayed in 2-D form, as shown schematically in FIG. 3, or in 3-D form. In an alternate embodiment, the shape of the volume itself displays. It is noted that data corresponding to the segmented region can be stored in computer-accessible memory in a number of ways, such as by storing coordinates of voxels lying along the periphery of the segmented region, for example.

A compute and display organ volume step 96 then computes and displays the organ volume using the segmentation information that has been generated and stored in memory. Both data corresponding to the segmented region and the computed volume can be stored in memory and provided as data to another computer or processor. As noted previously, one of the main reasons for segmenting an organ in a 3-dimensional image is to calculate the size of the organ. Embodiments of the present invention calculate the size of the organ of interest by determining the number of voxels included in the final segmentation region and multiplying that number by the volume of a single voxel, as specified by voxel spacing data stored with the volume image.

In at least one embodiment, obtain image step 70 in the sequence of FIG. 5 includes obtaining contrast agent data for the patient. In this embodiment, whether or not the patient has received a contrast agent is ascertained. If not, image processing can proceed, with suitably adjusted variables for improved performance where no contrast agent has been used. If so, factors such as type of contrast agent, amount of time since ingestion, patient size and weight, and other factors may also influence the values of various thresholds and parameters used in segmentation processing, such as for spatial filtering for noise compensation, for example.

Although the technology described herein has been described primarily with reference to volumetric CT images for segmenting liver organs, those skilled in the art will appreciate that the general processes described herein can be used to segment other organs in a body including, but not limited to the spleen, gall bladder, and heart. In addition, those skilled in the art will recognize that the present invention can be used with CT or other volume images from various imaging modalities, such as MR volumetric images. The voxel values of volumetric MR images are different from the Hounsfield units (HU) used in CT volumetric images. However, the tissue of organs-of-interest still can be differentiated from background tissue in volumetric MR images. The seed point that is used as a starting point is typically indicated by the radiologist or other viewer, but may be automatically generated.

Those skilled in the art will recognize that there are many different algorithms that can be used to calculate a geodesic distance map or a cost function variant of geodesic distance map that can be used in the present invention.

Those skilled in the art will recognize that the level set method approach described by J. A. Sethian in the text cited previously can also be used with the present invention. The level set method provides a many-at-once wave-front surface progression method that can incorporate more mathematically complex cost-functions (with a corresponding increase in required computational resources).

Although the technology described herein was developed and tested with volumetric images of human patients, those skilled in the art will recognize that the present invention is also applicable to volumetric images of mammalian and other animals.

Although the present invention was described with application to a 3-dimensional medical digital imaging application, those skilled in the art will recognize that the technology described herein is applicable to 2-dimensional image analysis applications as well. Most region growing techniques, and the Fast Marching technique in particular, have a corresponding 2-dimensional embodiment. For example, the above 3-dimensional technology can also be applied to a single CT slice, i.e., a 2-dimensional entity.

Volume Measurement and Reporting

As was noted earlier with respect to the logic flow diagram of FIG. 2, segmentation processing is used not only for the purpose of showing the outline of the segmented organ on display devices 42a and 42b, but also for the purpose of volume computation and reporting. Embodiments of the present invention require some type of segmentation processing as a prerequisite for volume processing. The segmentation method described hereinabove has been shown to provide improved results over conventional segmentation techniques. However, it is noted that the volume computation and reporting methods of the present invention can be used with any appropriate segmentation method that provides some level of accuracy.

Figure 6:
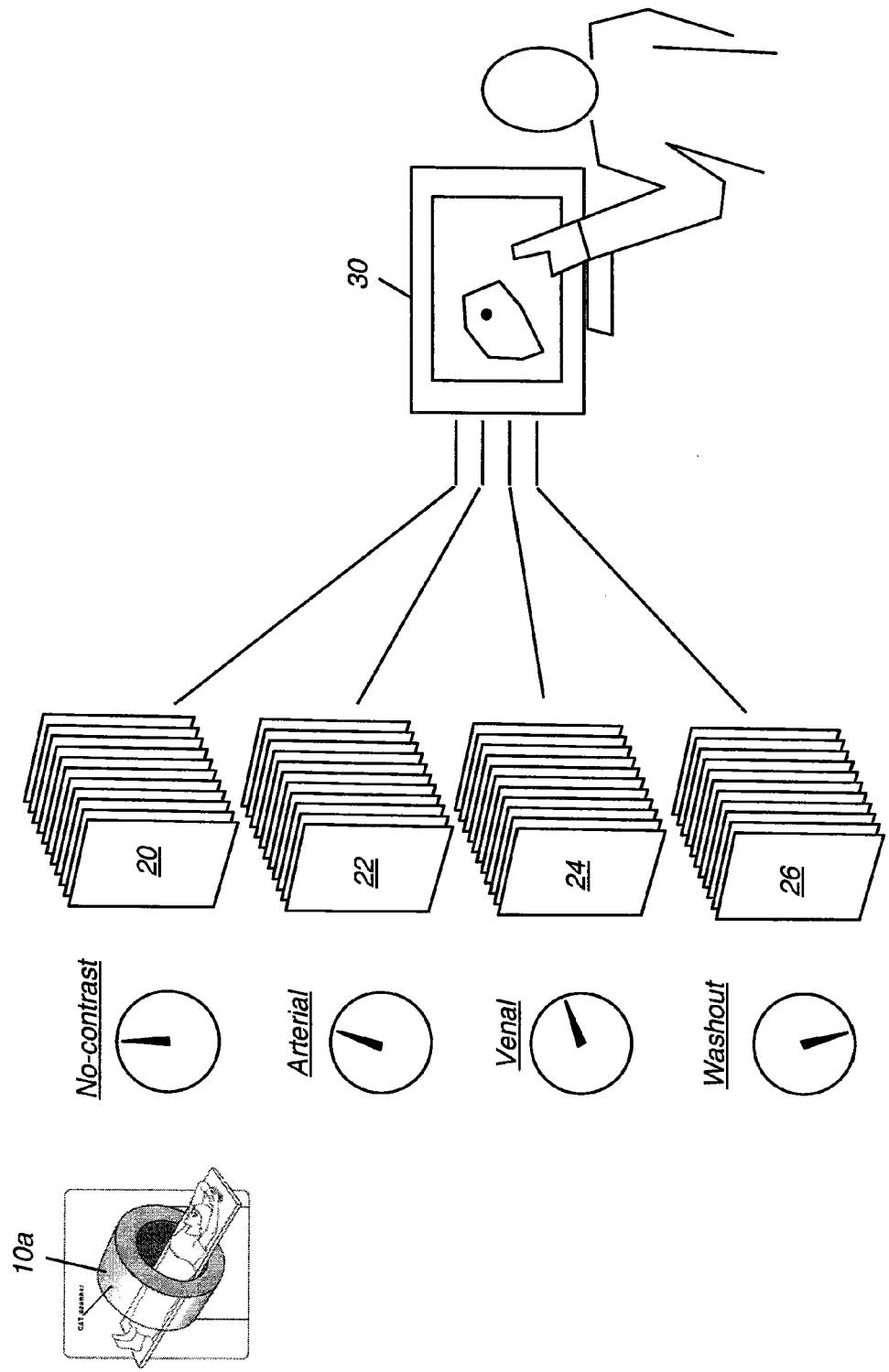
FIG. 6 is a schematic diagram that shows different volume image series used for a patient.

As was described earlier, organ imaging for the liver or other bodily organs can take advantage of a contrast agent and may provide volume images at different stages as the contrast agent progresses through the organ. Referring to FIG. 6, a standard sequence for imaging of the liver is shown, with four different volume imaging series 20, 22, 24, and 26, each imaging series obtained from volume image capture device 10a at a different time, before and following introduction of the contrast agent. A no-contrast series 20 obtains a volume image at the start of the sequence, without introducing a contrast agent to the organ. After an interval following administration of the contrast agent, an arterial volume image series 22 is obtained, providing a volume image that shows progress of the contrast agent into arteries of the liver. After another delay, a venal volume image series 24 is obtained, providing a volume image that shows further progress of the contrast agent into veins of the liver. A last image series, a washout volume image series 26 obtains a volume image that shows remaining contrast agent after a period of time elapses. A practitioner or other viewer can select and display one of the volume images generated from its corresponding series on a display 30. Consistent with an embodiment of the present invention, the practitioner optionally also specifies a seed point 180 that is used to generate the segmentation of the liver or other organ. As was noted previously, the arrangement of the patient study shown in FIG. 6 is just one example of a typical patient study; other arrangements of image series can be used, including a study with only one or two imaging series.

Segmentation operates at its best under the proper image conditions. In some cases, for example, segmentation processing is more accurate when operating on a higher contrast image, but generally not where contrast is excessive. In the segmentation processing described hereinabove, segmentation tends to be accurate with the no-contrast image. In general, segmentation results vary according to the segmentation algorithm and to the level of contrast agent that is administered to the patient.

Figure 7:
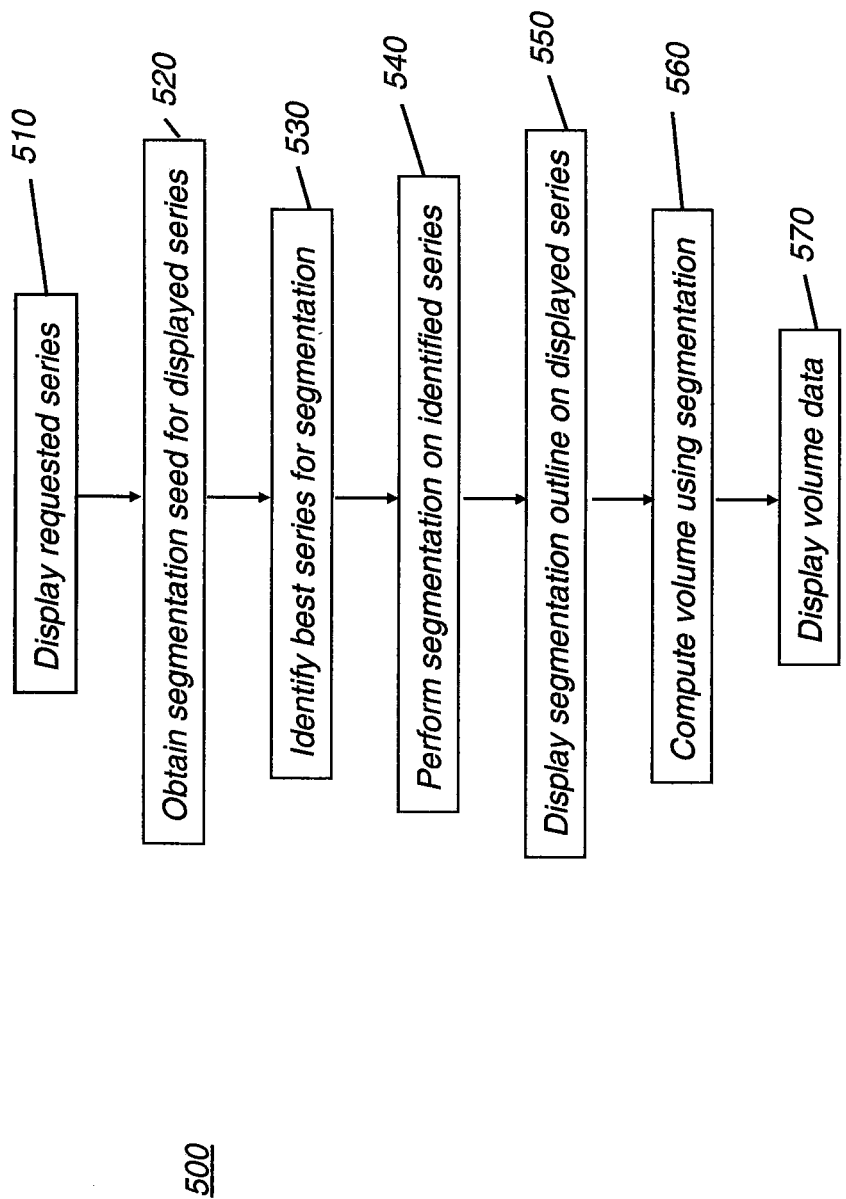
FIG. 7 is a logic flow diagram that shows a sequence for volume computation and display.

Embodiments of the present invention take advantage of the fact that a particular patient study can have different series, such as those described with reference to the study arrangement in FIG. 6, wherein the obtained series relate to different timing in the diffusion of a contrast agent through the organ. Often, one series is preferred for viewing by the practitioner, such as the arterial or venal view in FIG. 6, depending on factors such as patient condition and regions of interest in a particular case. At the same time, however, automated segmentation and volume computation algorithms executed by the computer may show improved accuracy when they operate upon a different series, such as upon the no-contrast series, for example. The logic flow diagram of FIG. 7 shows a sequence of steps used in a volume generation process 500 for generating and displaying volume value data corresponding to the sequence of volume images obtained from a patient according to an embodiment of the present invention. In a display step 510, the practitioner requests a volume image from one of the series of images obtained as shown in FIG. 6. Typically, the image selected for practitioner viewing is an image that shows the progress of a contrast agent at some point, although the requested image could be a no-contrast volume image, for example. In a seeding step 520, the practitioner instruction provides coordinate information on an initial seed point from which segmentation begins. The practitioner instruction, for example, may be provided by obtaining coordinates from a touch screen. Alternately, an automated seed point selection algorithm may be executed to obtain the seed point. An analysis step 530 follows, in which a decision is made concerning which volume image series or group of image series provides the most accurate segmentation and volume calculation. The preferred volume image series for this purpose may be a different series from the series selected for viewing. This decision can be based on volume image characteristics such as the following:

(i) image contrast. Depending on the type of segmentation processing and volume calculation used, one volume image series may be preferred over another based image contrast. For example, the arterial or venal volume image series may be advantaged over the washout or no-contrast series based on image contrast.

(ii) noise level. A higher noise level may tend to degrade segmentation and volume computation accuracy. One volume series may be preferred over another according to the effect of noise level on the segmentation and volume computation algorithms. The venal volume image series may be advantaged over the no-contrast volume image series based on the detected noise level in the image data.

(iii) patient condition. A liver with irregular structure or a higher number of lesions may be more accurately segmented using the no-contrast or washout volume image series, for example.

Analysis step 530 may alternately determine that two, three, or all image series should be used for volume calculation, such as by averaging or otherwise combining their results. In this case, segmentation of two, three, or all four volume image series is required.

Continuing with the logic flow of FIG. 7, a segmentation step 540 then performs segmentation processing on each of the image series specified in analysis step 530. Segmentation step 540 may use the same segmentation algorithm and parameters for each volume image series. Alternatively, different algorithms or different parameters can be used, depending on the volume image series that is being processed.

An optional outline display step 550 displays the segmentation outline in highlighted form to the practitioner or other viewer, such as by overlaying the segmentation outline onto the view selected for display. This feature promotes visual review of the segmentation processing results. A practitioner, for example, may readily be able to tell that segmentation over-compensated for a contrast problem or was not aggressive enough given the image data obtained. The outline can display on the full sized volume image display or on one or more thumbnail images, for example. In one embodiment, one or more lower-resolution images display to relate the computed segmentation outline to image data for orthogonal views within an imaging series.

In a volume computation step 560, results from the segmentation process are used to calculate the volumetric size of the liver or other organ of interest. Consistent with embodiments of the present invention, volume calculation can use any of the image volume series that have been obtained for the patient in the imaging sequence, such as the sequence of FIG. 6, using the seed point specified by the practitioner, as follows:

(i) perform segmentation on the same volume image series that is currently displayed;
(ii) perform segmentation using volume image series data from one or more of the volume images that are not currently displayed, using the seed point specified on the displayed volume image.

The segmentation and volume data calculation are then displayed with reference to any volume image that displays for that patient imaging session.

Thus, for example, where display 30 shows the arterial volume image series and the practitioner enters a seed point for segmentation on that image series, volume generation process 500 of the present invention may perform segmentation and volume calculation using the washout volume image series based on analysis step 530. Alternately, data from two or more of the different volume image series can be combined in some way or analyzed statistically in order to provide a volume computation that displays in a display step 570. For example, the statistical mean value can be obtained from computed values obtained in two, three, or four different volume image series, including or excluding the data for the volume image series that is currently displayed. The median value of computed volumes from multiple volume image series could be used. Results for different volume image series can also be differently weighted, so that, for example, each volume image specified in analysis step 530 contributes some portion of the overall organ volume computation.

Applicants have recognized that different series of volume images, such as the no-contrast, arterial, venal, and washout series described hereinabove, have different diagnostic value to the practitioner, depending on patient condition, practitioner preferences, and other variables. Segmentation and organ volume computation, meanwhile, may or may not operate best on the same image series that is selected for viewing. It is observed that the practitioner need not be aware of which volume image series data is being processed in order to provide the segmentation data and calculated volume value.

In an alternate embodiment, different volume values are shown, such as showing the volume calculation from each volume image series or showing the difference between two volume image series. Embodiments of the present invention allow the practitioner to ascertain which imaging series are used for volume calculation and to review results in a number of ways.

Figure 8A:
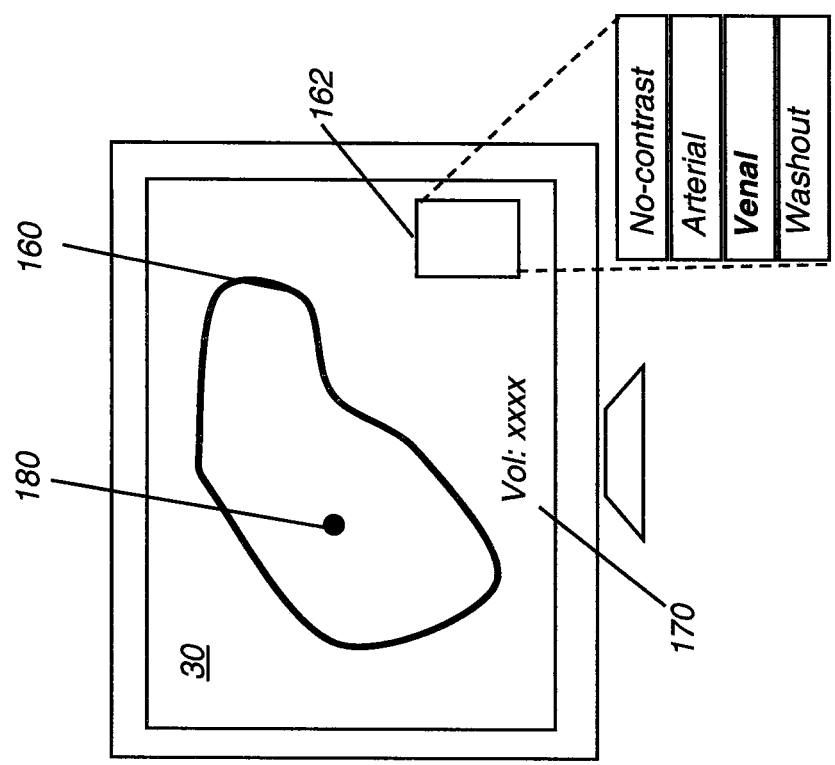
FIGS. 8A, 8B, 8C, and 8D show operator interface examples for a display apparatus according to an embodiment of the present invention.
Figure 8B:
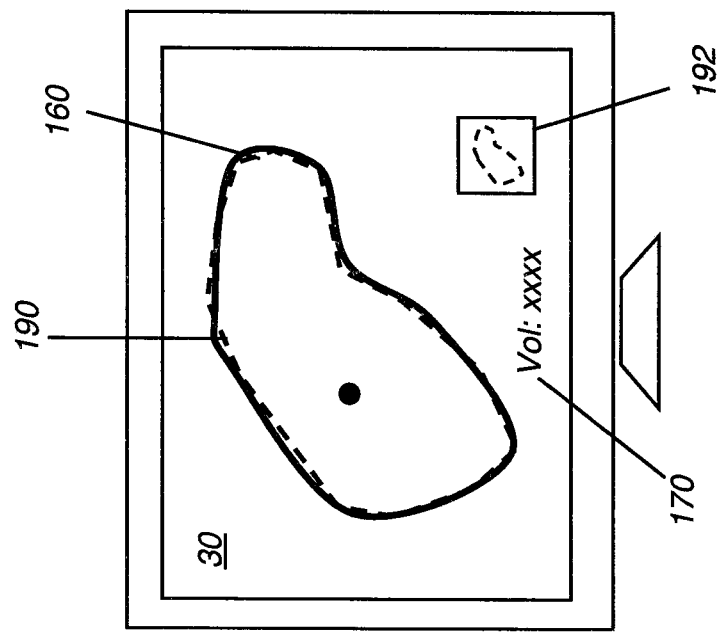
Figure 8C:
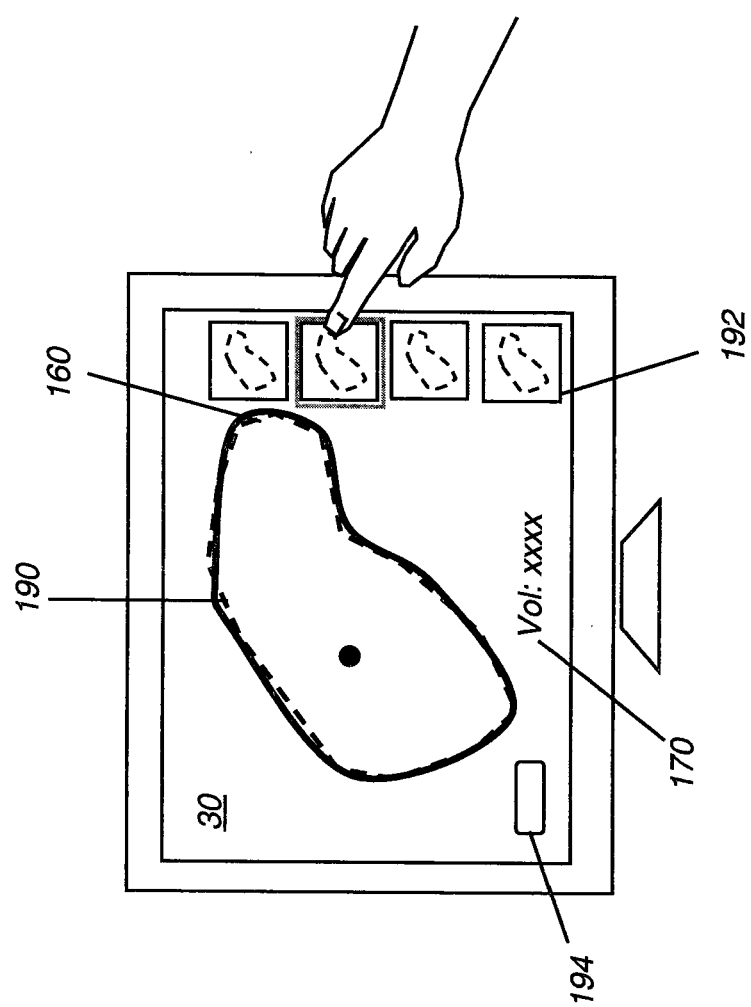

The plan views of FIGS. 8A, 8B, 8C, and 8D show features of an operator interface for viewing each image series according to an embodiment of the present invention. A menu 162 enables display 30 to present a particular volume image series for an organ 160. The example display of FIG. 8A shows menu 162 selections for the same image series identified in FIG. 6. Volume value 170 provides the computed volume information. The viewer can specify a seed point 180 for segmentation on the image displayed. Following segmentation, an outline 190 displays, as shown in FIG. 8B. An optional thumbnail 192 may also be provided to show at least the relative shape of the segmented organ. In the example of FIG. 8C, thumbnails 192 are provided as controls to initiate display of an alternate image series, enabling the practitioner to select a particular image series for viewing and to review segmentation and volume computation data that is obtained for the selected image series. This can be of value, for example, where the practitioner wants confirmation that organ segmentation was successful and where it is useful to compare volume computation for different image series. Consistent with an embodiment of the present invention, information on display 30 also indicates which image series are used to calculate organ volume, shows the raw data from each volume calculation, and enables the practitioner to specify which image series are included in or excluded from that calculation.

Still referring to FIG. 8C, an optional control 194 displays when there is previously obtained volume image data available for the same patient. Using this function, the practitioner can obtain earlier image series for the patient, from imaging studies taken hours, days, weeks, or months earlier. This stored image series data can be analyzed using the segmentation and volume computation utilities described herein and then compared against more recent image series. Using this utility, the practitioner can learn about changes in organ size for the liver or other organ of interest. Volume computation can be used to compare organ volume at these different times, for example, or to show a rate of change in volume over a time period, such as with ingestion of fluid, for example.

Figure 8D:
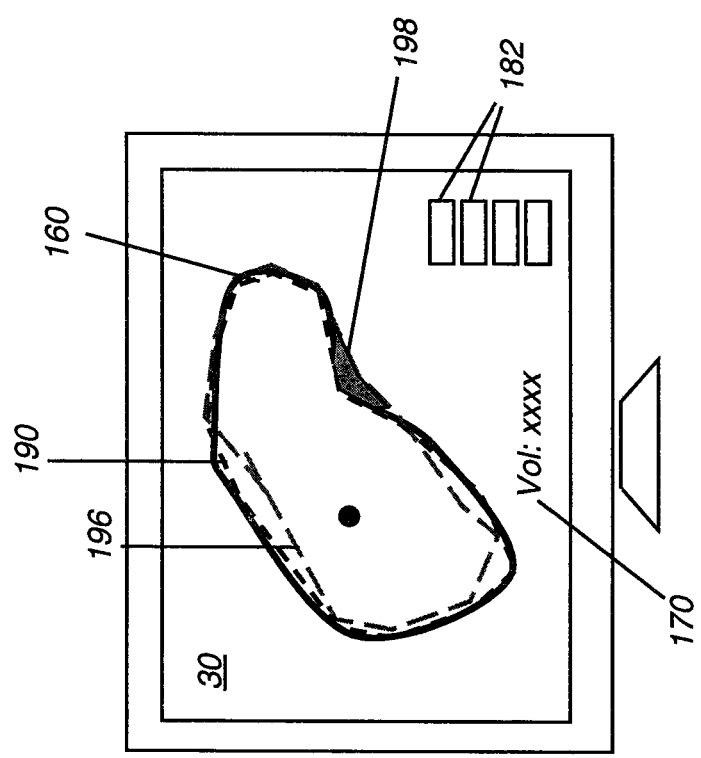

FIG. 8D shows how different segmentations are compared against each other according to an embodiment of the present invention. Outlines 190 and 196 show the results of segmentation for two different image series, both overlaid on a view of organ 160. This type of display allows the practitioner to visually compare the results from segmentation processing on different image series and can help to determine which of the series appear to provide more accurate volume value data. Outlines display in different colors in one embodiment of the present invention. Optional shading 198 is used to indicate gaps or differences between segmentation outlines 190 and 196. A set of controls 182 act as toggles for selectively enabling or disabling the different outline views. Controls 182 or selection of a particular outline 190, 196 can also be used to change the displayed view, so that data related to a particular image series is shown. Controls 182 can be used to toggle between different volume images or views, for example. In one embodiment of the present invention, controls 182 identify the calculated volume value; selection of the control then displays the corresponding volume image for the calculated value.

In an alternate embodiment of the present invention, particular structures of interest that are prominent in one imaging series are overlaid onto image data from another imaging series. For example, vascular structures from an arterial series can be sufficiently pronounced to segment the vascular structures themselves. This set of structures can then be overlaid onto a no-contrast series, for example. Still referring to FIG.

8D, controls 182 can be used to act as toggles for overlaying this type of feature from one image series to the next.

Volume computation itself is known to those skilled in the image processing arts and, for 3-D volume images, can be based, for example, on its 2D image counterparts, extended to an additional dimension.

Seed Point Correlation Between Image Series

It is noted that the seed point, as shown in FIG. 8A, is specified in one series of volume image that is displayed, but can be used for any of the other volume image series. Techniques are known for correlating points in space between different volume image sets, and there is some tolerance for error due to the relative size of the organ and number of voxels its image data occupies. Embodiments of the present invention use a seed point selected from one volume image series, typically the volume image that the practitioner is currently viewing. A corresponding seed point is then determined for the volume image series that will be used to perform the organ segmentation processing, which may be different from the volume image series being viewed.

Although two different volume image series, one for generating the seed point and the other for segmenting the organ, can be taken of the same patient, the position and orientation of the patient can shift in the interim between the two image series acquisition events. In addition, the two captured volume image series can also correspond to different points in the patient inspiration cycle. These are just some of the factors that can complicate the seed point translation process from one volume image to another.

Consistent with one embodiment of the present invention, a rigid body registration algorithm is utilized to calculate the translated seed point position. It should be noted that other forms of registration algorithms such as non-rigid or affine registration can alternately be used. In brief, procedural steps for the rigid registration algorithm are as follows.

(i) Let A refer to the volume image for which the seed point is specified. Let R refer to the volume image corresponding to the translated seed point.

(ii) Calculate a 3×3 matrix [M] plus a 3×1 offset vector V that are applied to the volume image A as $$A'=[M](A-V)$$

such that the calculated volume image A' is a translated and rotated version of volume image A. The optimized matrix [M] and offset vector V are calculated by varying the matrix and offset vector while minimizing the difference E between the volume images A' and R. Mathematically, E is given as:

$$E=\Sigma(A'_{ijk}-R_{ijk})^2$$

the sum of the squared voxel differences. The matrix [M] has nine scalar values that can be calculated from three fundamental rotation angles about the x, y, and z axes. Thus, there are six parameters that need to be varied in order to find the optimum transformation, that is, three rotation angles and three offset scalars for the offset vector. A downhill simplex algorithm (*Numerical Recipes in C,* by Press, Flannery, Teukolsky, and Vetterling Cambridge University Press 1988, 2d edition, pp 408-412) is used to vary and optimize the six parameters. For each iteration of the downhill simplex algorithm, one of the six parameters is changed, the matrix and or vector and volume image A', and difference value E are recalculated. Based on the new value of E, the downhill simplex algorithm determines which of the six parameters to change for the next iteration. Eventually, the iterative calculations are stopped after a fixed number of iterations or when the new value of E has not changed significantly from the last value of E. The final matrix [M] and offset vector V are used to translate the seed point coordinates (x,y,z) corresponding to volume image A to new coordinates (x',y',z') corresponding to volume image R. These new coordinates represent the translated seed point that is used for the organ segmentation algorithm.

It is noted that the segmentation result is not particularly sensitive to the selection of the seed point for liver segmentation according to the present invention. Therefore, errors in the seed point translation process do not significantly affect the final quality of the calculated organ volume size. If the seed point translation processing produces a translated seed point that is not within the region corresponding to the organ of interest, the segmentation algorithm may fail.

The image processing operations given in the description above can be implemented and stored as a computer program stored in a computer readable storage medium. The computer readable storage medium can include, for example: magnetic storage media such as a magnetic disk or magnetic tape; optical storage media such as an optical disc, optical tape, or machine readable bar code; solid state electronic storage devices such as random access memory (RAM), or read only memory (ROM). The associated computer program implementation of the present invention can also be stored on any other physical device or medium employed to store a computer program. It is also possible to implement software functions of the present invention using one or more electronic circuits.

The invention has been described in detail with particular reference to certain preferred embodiments thereof, but it will be understood that variations and modifications can be effected within the spirit and scope of the invention. For example, while the description herein focused on liver segmentation and volume computation, the same processing procedure could also be used for other organs such as the kidney, gall bladder, stomach, and heart, for example, with suitable contrast agents or other organ conditioning.

The invention claimed is:

1. A method for providing a calculated volume data value for an organ of a patient, comprising:
  acquiring image data for a first volume image series and for at least a second volume image series for the patient;
  displaying the first volume image series;
  responding to an instruction to generate the volume data value by:
    (i) identifying a seed point in the first volume image series;
    (ii) correlating the seed point to the second volume image series;
    (iii) segmenting the organ in at least the second volume image series according to the correlated seed point; and
    (iv) calculating the volume data value for the organ using at least the segmented second volume image series; and
  displaying the calculated volume data value.

2. The method of claim 1 wherein identifying the seed point comprises accepting an operator command.

3. The method of claim 1 wherein identifying the seed point comprises accepting a touch screen command.

4. The method of claim 1 wherein computing the volume data value comprises obtaining an average value.

5. The method of claim 1 wherein computing the volume data value comprises obtaining a weighted value.

6. The method of claim 1 wherein computing the volume data value comprises obtaining a median value.

7. The method of claim 1 wherein the organ is a liver.

8. The method of claim 1 wherein the first and second volume image series differ according to use of a contrast agent.

9. The method of claim 1 wherein acquiring the image data further comprises acquiring a third volume image series and a fourth volume image series for the patient.

10. The method of claim 1 wherein the first volume series is obtained before administration of a contrast agent.

11. The method of claim 1 further comprising displaying at least an outline of segmentation from the second volume image series.

12. The method of claim 1 further comprising computing a difference between calculated data volume values for the first and second volume image series.

13. The method of claim 1 further comprising spatially filtering the first and second volume images.

14. The method of claim 1 further comprising displaying a first outline for the second segmented volume image and a second outline for a segmented volume image from a different volume image series.

15. The method of claim 1 further comprising providing a display that shows a difference between segmentation for the second volume image and a different volume image series.

16. The method of claim 1 wherein displaying the calculated volume data value further comprises displaying a plurality of values from volume computation for different image series.

17. The method of claim 1 wherein the first and second volume image series are obtained on different days.

18. The method of claim 1 further comprising displaying a reduced-resolution image as a control to initiate display of another volume image.

19. The method of claim 18 further comprising showing a segmentation outline on the displayed reduced-resolution image.

20. A method for providing a calculated volume value for an organ of a patient, comprising:
   acquiring image data for a first volume image series for the patient and for at least a second volume image series, wherein the first volume series is obtained before administration of a contrast agent and the second volume series is obtained following administration of a contrast agent;
   displaying the first volume image;
   responding to an instruction to calculate the volume value by:
     (i) identifying a seed point in the first volume image;
     (ii) correlating the seed point to the second volume image;
     (iii) segmenting at least the second volume image according to the correlated seed point; and
     (iv) computing the volume value using at least the segmented second volume image; and
   displaying a segmentation outline on the displayed first volume image and displaying the calculated volume data.

21. The method of claim 20 wherein the organ is taken from the group consisting of a liver, a kidney, a gall bladder, a stomach, and a heart.

* * * * *